(12) United States Patent
Duda et al.

(10) Patent No.: US 7,349,508 B2
(45) Date of Patent: Mar. 25, 2008

(54) METHOD FOR RECONSTRUCTING DATA CLOCKED AT A SYMBOL RATE FROM A DISTORTED ANALOG SIGNAL

(75) Inventors: Thomas Duda, Duisburg (DE); Lajos Gaszi, Düsseldorf (DE); Peter Gregorius, München (DE); Torsten Hinz, Neuss (DE); Martin Renner, Mettmann (DE)

(73) Assignee: Infineon Technologies AG, Munich (DE)

( * ) Notice: Subject to any disclaimer, the term of this patent is extended or adjusted under 35 U.S.C. 154(b) by 907 days.

(21) Appl. No.: 10/714,202

(22) Filed: Nov. 14, 2003

(65) Prior Publication Data

US 2004/0120433 A1    Jun. 24, 2004

Related U.S. Application Data

(63) Continuation of application No. PCT/EP02/05106, filed on May 8, 2002.

(30) Foreign Application Priority Data

May 17, 2001    (DE) .................. 101 24 177

(51) Int. Cl.
    *H04L 7/00* (2006.01)
(52) U.S. Cl. .................. 375/355; 375/316; 375/229
(58) Field of Classification Search .......... 375/355, 375/316, 229
    See application file for complete search history.

(56) References Cited

U.S. PATENT DOCUMENTS 5,293,405 A   3/1994   Gersbach et al. ............ 375/14
5,933,467 A   8/1999   Schier et al. ................. 375/350
6,067,319 A * 5/2000   Copeland ..................... 375/232
6,130,793 A * 10/2000  Ohmori et al. ............... 360/53

FOREIGN PATENT DOCUMENTS

| EP | 0 467 412 A2 | 7/1991 |
| EP | XP-002224302 | 8/1993 |
| EP | 0 831 480 A1 | 9/1996 |

* cited by examiner

*Primary Examiner*—David C. Payne
*Assistant Examiner*—Nader Bolourchi
(74) *Attorney, Agent, or Firm*—Eschweiler & Associates, LLC

(57) ABSTRACT

A method and a device for reconstructing data, clocked at a symbol rate, from a signal which has been distorted by transmission of a transmission link, are disclosed. The method or respectively, the device, being predominantly performed or implemented, respectively, by means of digital circuit technology in order to improve the quality of the data recovery. The method includes amplifying the signal amplitude attenuated by the transmission; filtering high-frequency interference frequencies above the symbol rate; discretizing the analog signal by means of an analog/digital converter; performing a cable approximation by means of a digitally implemented cable approximation filter in order to obtain an equalized signal; and recovering the data from the equalized signal by means of a phase-locked loop.

32 Claims, 2 Drawing Sheets

METHOD FOR RECONSTRUCTING DATA CLOCKED AT A SYMBOL RATE FROM A DISTORTED ANALOG SIGNAL

CROSS REFERENCE TO RELATED APPLICATION

This application is a continuation of copending International Application No. PCT/EP02/05106 filed May 8, 2002, and claiming a priority date of May 17, 2001, which designates the United States.

TECHNICAL FIELD OF THE INVENTION

The invention relates to a method and to a device for reconstructing data clocked at a symbol rate, particularly to the purely stochastic data, from an analog signal which has been distorted and attenuated by the transmission of a transmission link.

In digital transmission systems, digital data in the form of rectangular or trapezoidal pulses are fed into a transmission cable, usually a metallic or optical cable and received with a receiver at the other end of the cable. Due to the transmission, the data signal is attenuated with respect to its amplitude and distorted with respect to its phase angle and group delay and, in addition, low- and high-frequency interference can be superimposed. The resultant distorted signal must be amplified and equalized by means of a receiver and the data information must be recovered. For this purpose, known receivers essentially comprise four components, namely an amplifier, an equalizer, a clock recovery circuit and a data recovery circuit.

FIG. 2 shows a known receiver for reconstructing data, which is predominantly constructed in analog circuit technology. The receiver path comprises a variable-gain amplifier (VGA) 32 with receiver inputs 30, 31, which amplifies the signal supplied at the input, a noise and crosstalk filter (frequently higher-order low-pass filters) which is constructed as a Bessel filter in this case, and a cable approximation filter 34 implemented as a SC biquad or GmC filter.

Following the cable approximation filter 34, an analog low-pass filter 35 is connected which cuts off higher frequencies, originating from noise and jitter, above the transmission frequency, i.e. the symbol rate and thus suppresses white or colored noise above the data rate.

The optimum case, the overall transfer function of the receiver path up to where the signal is discretized by a comparator 36 forms the inverse transfer function of the cable of a frequency in amount and phase. As a result, the signal present at input 30, 31 is essentially completely equalized and can be supplied to a data recovery circuit.

To adjust the signal amplitude, the signal is weighted according to the amplitude with the aid of a peak detector or amplitude detector 39 and level detector 38 following the low-pass filter 35, the gain of the amplifier 32 is adjusted in accordance with the amount of the amplitude. Depending on the gain set, the cable approximation filter 34 is matched to the cable transfer function in discrete steps. For this purpose, an equalizer control unit 37 which is connected to the amplifier 32, the cable approximation filter 34, the comparator 36 and the level detector 38 determines the coefficients of the cable approximation in order to duplicate the inverse of the cable transfer function as accurately as possible.

A disadvantage of this analog implementation is, in particular, that the set pole and null positions of the noise and crosstalk filter used and of the cable approximation filter are influenced by parasitic pole and null positions as a result of which the ideal adaptation function of the receiver is correspondingly corrupted.

Furthermore, an analog implementation for equalizing and recovering data is susceptible to production tolerances and applicative variances of the transmission channel. In addition, temperature gradients and mechanical gradients can additionally restrict the operational quality of the sensitive circuits in the receiver and thus impair any error-free recovery of the attenuated and distorted signals.

Furthermore, the number of sets of coefficients for the cable approximation is restricted in analog implementations as a result of which the quality of the cable approximation is also limited. This is because the coefficients of the approximation filter which are determined from a system simulation are only ideal for a particular cable type in a given application condition. Variances in the application conditions such as, e.g. different cable lengths, different temperatures etc often lead to erroneous data detection and thus to higher bit error rates, i.e. to poor data recovery.

Furthermore, it must be noted that, in particular, in the case of great cable lengths or generally in the case of a high cable attenuation, the distance from one interpolation point or set of coefficients to the next interpolation point or set of coefficients is decisive for the error rate due to the $\sqrt{f}$ characteristic, i.e. the dependence of the cable attenuation on frequency and cable length. If the distance between two interpolation points is too great when the cable attenuation is high, the bit error rate rises more than proportionally for intermediate values to the two adjacent interpolation points. To prevent this effect, the distance between interpolation points and thus the sets of coefficients must be reduced, and thus the number of interpolation points must be increased, toward high cable attenuation.

This can be achieved only inadequately due to parasitic influences and properties of analog approaches to equalization.

SUMMARY OF THE INVENTION

It is, therefore, the object of the present invention to improve the quality of equalization and data recovery and to reduce the bit error rate significantly.

An essential concept of the invention consists in implementing most of the elements of the receiver according to the invention in digital circuit technology since the coefficients or parameters for digital elements such as e.g. digital filters can also be changed easily during operation. Incidentally, the compatibility of the receiver in analog/digital implementation with respect to input jitter is considerably improved by an analog/digital implementation.

The invention provides further advantages by means of a simpler implementation of an anti-aliasing filter by means of the oversampling of an analog/digital converter and the possibility of subsequent matching of the circuit to all the characteristics of the transmission channel.

The method according to the invention for reconstructing data from a signal which has been distorted and attenuated by transmission of a transmission link essentially comprises the following steps:

a) amplifying the signal amplitude for compensating for the cable attenuation;
b) filtering of high-frequency interference frequencies above the symbol rate and filtering of low-frequency interference below the lowest spectral component of the useful signal;

c) discretizing the analog signal by means of an oversampled analog/digital converter;

d) forming a cable approximation with the aid of a digitally implemented cable approximation filter in order to obtain an equalized signal; and e) recovering the data from the equalized signal, the recovered data stream being output, in particular, synchronously with the recovered clock.

According to a preferred embodiment of the invention, an analog/digital converter is used which oversamples the signal n-times and during this process preferably transforms low-frequency noise into higher-frequency spectral noise components above the data rate. Preferably, an SD-ADC (sigma delta analog/digital converter) is used, the specific noise shaping characteristic of which is used by the oversampling.

This is a further essential aspect of the invention. The oversampling of the signal by an SD-ADC is optimally performed at a minimum sampling rate of $n \geqq 8$. The high rate of the sampling rate reduces the requirements for the series-connected anti-aliasing filter with respect to the pole or cut-off frequency and also the stability of the pole frequency. The choice of sampling rate is dependent on the desired noise shaping characteristic of the SD-ADC, the ordinal number to be implemented and the filter type of the anti-aliasing filter and to the subsequent low-pass filtering for delimiting the bandwidth of the signal.

All units following the analog/digital converter up to the data output of the receiver are preferably implemented in digital circuit technology.

The signal output by the analog/digital converter is preferably filtered again by means of a filter (higher-order digital low-pass filter) where, in particular, external (channel) noise, quantization noise and the noise transformed by noise shaping is suppressed above the symbol rate (transmission frequency) and thus the useful signal is band-limited above the symbol rate. In this arrangement, the digital filter preferably has a cut-off frequency which is very narrowly, in particular only 10-20% above or almost at the symbol rate.

According to a preferred embodiment of the invention, the data rate of the signal bandlimited in this manner is produced, by means of a decimator, to a lower clock rate for further processing. In particular, this significantly reduces the circuit complexity (and the power consumption) for a subsequent filter stage.

The subsequent filter stage preferably comprises a digital high-pass filter for suppressing offset and DC components below a predetermined lower cut-off frequency, particularly below the lowest spectral component of the data stream.

According to a preferred embodiment of the invention, a digital cable approximation filter, particularly a FIR (finite impulse response) filter is used for compensating for the channel distortion. Due to the fact that the data rate has been decimated before the cable approximation filter, the circuit complexity and particularly the area and the current consumption is considerably reduced for this filter.

The transfer characteristic of the cable approximation filter is similar to a high-pass filter due to the duplication of an inverse cable attenuation. This leads to noise caused by a finite word length (quantization noise) and/or finite word width of the coefficients within the useful signal spectrum to be adapted being amplified. This characteristic is generally called noise enhancement. Attention must be paid to the fact that the word width is sufficiently long since the filter implementation is based on computing operations.

The gain of the amplifier stage at the receiver input and the characteristic of the digital cable approximation filter can be adjusted and adapted to altered application conditions even in operation.

According to a preferred embodiment of the invention, the amplifier stage and the digital cable approximation filter are controlled by an equalizer control unit which selects and sets the optimum set of filter coefficients for the digital cable approximation filter in dependence on the signal amplitude.

The data for the digital cable approximation filter are preferably stored in a RAM or ROM memory but can also be loaded from an external source via a digital interface.

According to a preferred embodiment, the data rate of the equalized signal is increased after the cable approximation filter in order to improve the subsequent clock and data recovery. For this purpose, an interpolation and filter unit is preferably provided which has a further digital low-pass filter for suppressing frequency components above the symbol rate which have been produced mainly by the interpolation.

The interpolation and filter unit is preferably located outside the control loop of a subsequent digital phase-locked loop for data recovery.

Phase-locked loops or PLL circuits are circuits for synchronizing the frequency and phase of two signal oscillations, particularly of clock signals. The output clock signal output at the output of the phase-locked loop is synchronous to the input clock signal present at the input in normal operation.

The control loop of the phase-locked loop preferably comprises a decimator, a phase detector and a device for setting the clock and phase control characteristic, particularly a timing loop filter. According to a preferred embodiment of the invention, the amplitude threshold value used in the phase detector is controlled by a peak detector (amplitude detector).

Furthermore, the digital phase-locked loop preferably comprises a unit for synchronizing the output data and a digitally controlled oscillator for generating the regenerated clock, the unit for synchronizing the output data supplying a data stream output synchronously with the clock of the oscillator.

An essential aspect of the PLL circuit according to the invention is a decimator arranged at the input of the phase-locked loop. The phase-locked loop requires that, depending on the phase angle with respect to the clock synchronization, a sample with the correct phase angle is selected from the data stream. This function is combined with a decimator for reducing the clock rate. The low-pass characteristic of the decimator is used for the additional suppression of noise components. Furthermore, the advantage lies in the reduction of the clock rate and of the required area and power consumption of the subsequent circuits.

The device according to the invention for reconstructing data from a signal which has been distorted by transmission over a transmission link comprises the following:

a) a programmable amplifier for compensating for the cable attenuation;

b) a low-pass filter for suppressing high-frequency interferers above the symbol rate, which is constructed as an analog anti-aliasing and crosstalk filter;

c) an oversampled analog/digital converter with noise-shaping characteristic for discretizing the analog signal;

d) a digitally implemented cable approximation filter for obtaining an equalized signal; and e) a preferably digital phase-locked loop for recovering the data and the clock from the equalized signal.

The device according to the invention preferably also comprises f) a low-pass filter for suppressing high-frequency interference frequencies above the symbol rate, which is preferably constructed as a digital noise and cross talk filter.
g) a high-pass filter for suppressing low-frequency interferers below the lowest spectral components of the useful signal;
h) a decimator for reducing the clock rate; and
i) an interpolator followed by a low-pass filter for increasing the clock rate and as a shaping filter.

BRIEF DESCRIPTION OF THE DRAWINGS

In the text which follows, the invention will be explained in greater detail by way of example by means of the attached figures, in which.

DETAILED DESCRIPTION OF THE PREFERRED EMBODIMENTS

Figure 1:
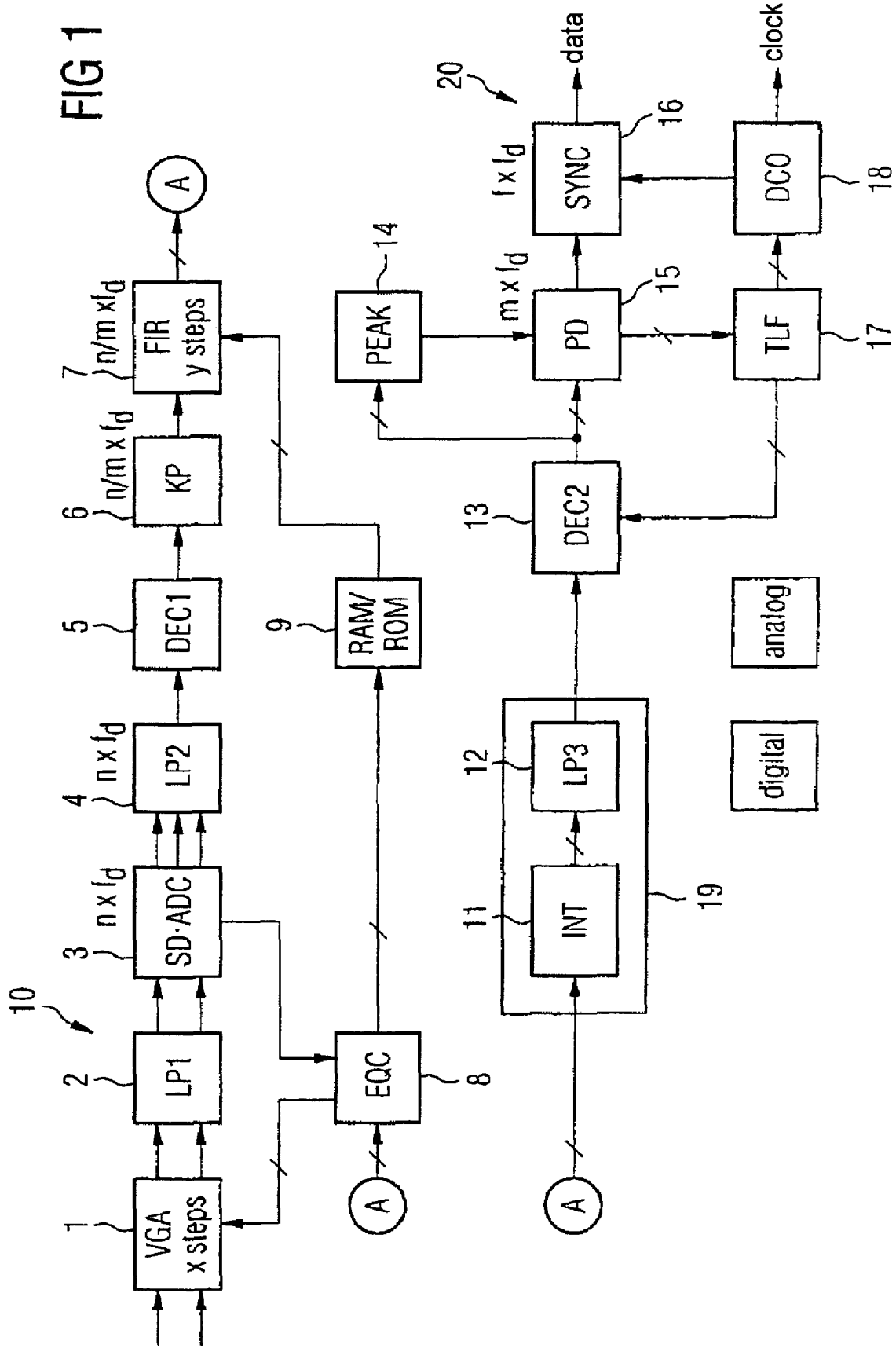
FIG. 1 shows a predominantly digitally implemented receiver according to an exemplary embodiment of the invention.

The receiver path of the equalizer 10 of FIG. 1 comprises (from the left to the right) an amplifier which is constructed as VGA Stage 1 and an analog low-pass filter 2 which forms an anti-aliasing and crosstalk filter for a subsequent oversampled analog/digital converter 3.

A low-pass filter 4, connected to the analog/digital converter 3, is used for suppressing noise components above the symbol rate and for limiting the signal bandwidth above this fundamental frequency, as a result of which external noise, quantization noise and the noise transformed by noise shaping is suppressed.

The analog/digital converter is constructed as SD-ADC (sigma-delta ADC) which oversamples the supplied signal n-times. Due to the oversampling, the noise-shaping characteristic of the converter is utilized.

To reduce the data rate by factor m, where, preferably, m=5-10, a digital decimator 5 is provided which is arranged between the digital low-pass filter 4 and a digital cable approximation filter 7.

A digital high-pass filter connected to the decimator 5 is used for filtering low-frequency noise and for offset and DC component suppression below the lowest spectral component of the data stream.

The output of the equalizer 10 forms a digital FIR filter 7 as a cable approximation filter for compensating for the cable distortion.

Furthermore, a digital equalizer control unit 8 is provided which controls the amplifier 1 and the FIR filter in dependence on the signal amplitude.

The equalized signal output at the output of the equalizer 10 is, in particular, linearly interpolated and limited in its bandwidth by means of an interpolation and filter unit 19 comprising an interpolation unit 11 and a low-pass filter 12. In this arrangement, the low-pass filter 12 is used for suppressing frequency components above the symbol rate which, in particular, have been produced by the interpolation.

The receiver also comprises a digital phase-locked loop comprising a decimator 13 which forms a part of the phase-locked loop. The control loop also comprises a phase detector 15 for determining the phase error of the detected data with reference to the recovered clock and a timing loop filter for adjusting the clock control characteristic.

The timing loop filter 17 is connected to the phase detector 15, the decimator 13 and a controlled oscillator 18 for generating the regenerated clock. The phase detector 15 is connected to the decimator 13, the timing loop filter 17, a peak detector 14 for readjusting the threshold value used in the phase detector 15, and a synchronization device 16 which supplies at the data output (data) a data stream which is synchronous with the clock of the oscillator 18. The clock is output at the clock output (clock).

Figure 2:
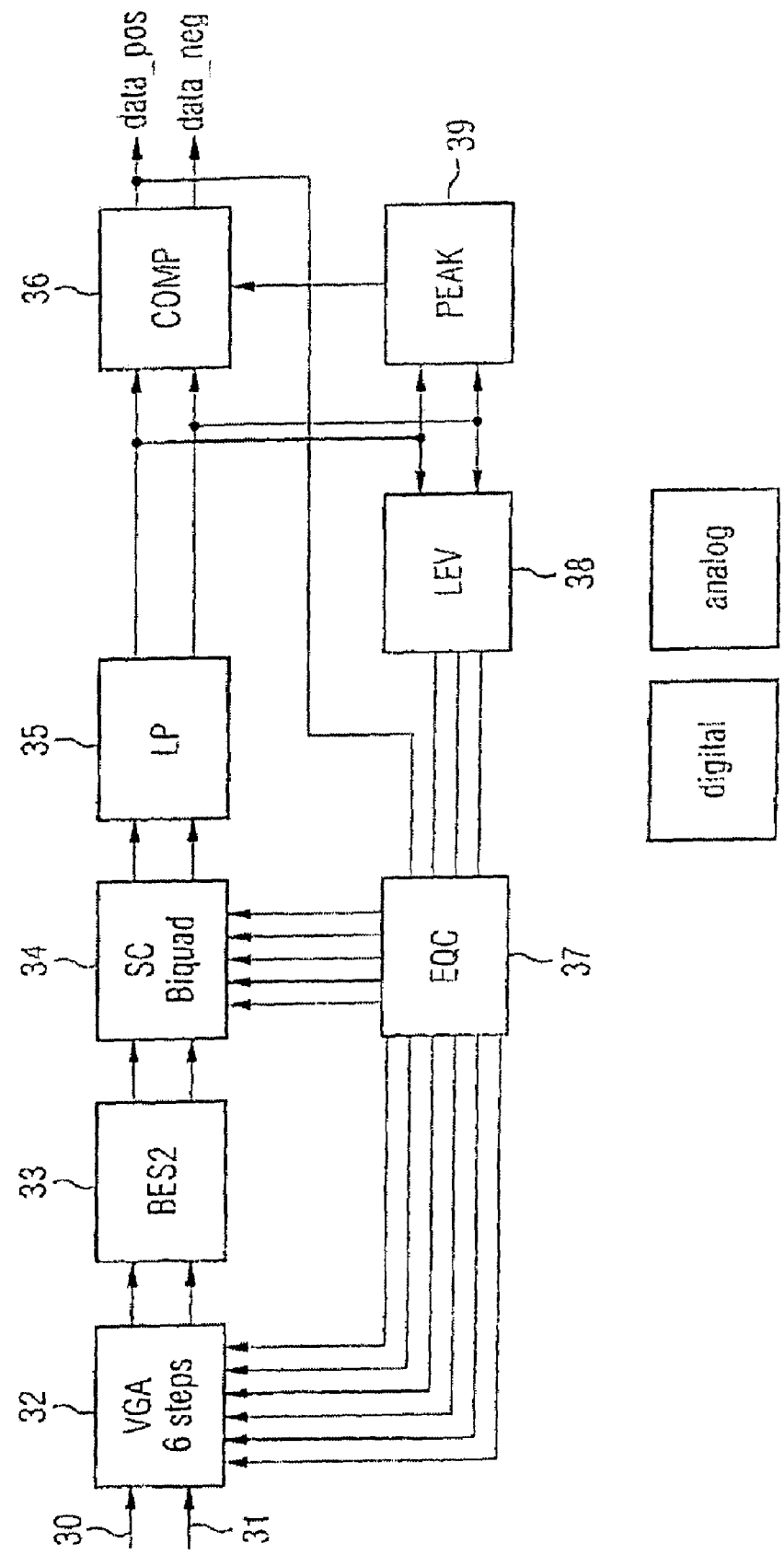
FIG. 2 shows a known receiver predominantly constructed by means of analog circuit technology.

With respect to the known receiver shown in FIG. 2, reference is made to the introduction to the description.

We claim:

1. A method for reconstructing data, clocked at a symbol rate, from an analog signal which has been distorted and attenuated by transmission of a transmission link having a cable transfer function, comprising:
   amplifying the signal amplitude of the analog signal that is attenuated by the transmission;
   filtering high-frequency interference of the analog signal at frequencies above the symbol rate, thereby generating an analog amplified filtered signal;
   discretizing the amplified filtered analog signal by means of an oversampled analog/digital converter to form a digital signal;
   carrying out a cable approximation by simulation of the inverse of the cable transfer function on the digital signal by means of a digitally implemented cable approximation filter in order to obtain an equalized signal; and
   interpolating and then low-pass filtering the equalized signal by means of an interpolation and filter unit; and
   decimating the interpolated and filtered signal by means of a decimator which is arranged in the control loop of a phase-locked loop for recovering the original data from the equalized signal.

2. The method according to claim 1, wherein the analog/digital converter oversamples the supplied data signal n-times in order to transform low-frequency noise into a higher-frequency spectrum.

3. The method according to claim 1, wherein the step of filtering of high-frequency interferers is performed by means of a digital filter which is arranged between the analog/digital converter and the cable approximation filter.

4. The method according to claim 1, further comprising the step of reducing of the data rate of the discrete signal by at least a factor of m=2 in order to obtain a decimated signal.

5. The method according to claim 1, further comprising filtering of low-frequency components below a predetermined lower cut-off frequency by means of a digital filter.

6. The method according to claim 5, wherein low-frequency components are filtered before the cable approximation is carried out.

7. The method according to claim 1, wherein the cable approximation is carried out by means of a digital FIR filter.

8. The method according to claim 1, wherein amplification of the signal amplitude and the cable approximation is controlled by a digitally implemented equalizer control unit.

9. The method according to claim 1, wherein the sets of coefficients required for setting the cable approximation are temporarily stored in a memory device.

10. The method according to claim 1, wherein the interpolation and low-pass filtering takes place outside a control loop of said phase-locked loop for clock and data recovery.

11. The method according to claim 1, wherein a regenerated clock running synchronously with the signal clock is generated by means of the phase-locked loop.

12. The method according to claim 1, wherein the decimation is controlled with the aid of a peak detector and of a phase detector.

13. The method according to claim 1, wherein the clock control characteristic of the phase-locked loop is adjusted by means of a timing loop filter.

14. The method according to claim 11, wherein the recovered data are output synchronously with the regenerated clock.

15. A device for reconstructing data clocked at a symbol rate from an analog signal which has been distorted and attenuated by transmission of a transmission link having a cable transfer function, comprising:

an amplifier for amplifying the signal amplitude of the analog signal attenuated by the transmission;

a low-pass filter for filtering high-frequency interferers in the analog signal at frequencies above the symbol rate, thereby generating an analog amplified filtered signal;

an analog-digital converter for discretizing the analog amplified filtered signal, thereby generating a digital signal;

a digital cable approximation filter having a transfer function which is matched to the inverse of the cable transfer function for generating an essentially equalized, discrete signal based on the digital signal;

a digital interpolation and filter unit for interpolating and then low-pass filtering the equalized signal; and a phase-locked loop for recovering the data from the equalized signal, a digital decimator being arranged in a control loop of the phase-locked loop.

16. The device according to claim 15, wherein the analog/digital converter oversamples the analog data signal n-times in order to transform low-frequency noise into a high-frequency spectrum.

17. The device according to claim 15, wherein following the analog/digital converter, a digital low-pass filter is provided for filtering high-frequency interferers above the symbol rate.

18. The device according to claim 17, wherein following the low-pass filter, a decimator is provided in order to obtain a decimated, decimated, discrete signal for a subsequent high-pass filter.

19. The device according to claim 15, wherein a high-pass filter is provided for filtering low-frequency components below a predetermined lower cut-off frequency.

20. The device according to claim 15, wherein a digital cable approximation filter comprises a FIR filter.

21. The device according to claim 20, wherein an equalizer control unit is provided for controlling the setting of the amplifier and the characteristic of the digital cable approximation filter.

22. The device according to claim 21, wherein the sets of coefficients for controlling the digital cable approximation filter are temporarily stored in a memory device.

23. A device for reconstructing data clocked at a symbol rate from an analog signal which has been distorted and attenuated by transmission of a transmission link having a cable transfer function, comprising:

an amplifier receiving an analog signal and generating an amplified analog signal;

a low-pass filter receiving the amplified analog signal and generating a filtered analog signal;

an analog/digital converter receiving the amplified filtered analog signal and generating a digital signal;

a digital cable approximation filter having a transfer function which is matched to the inverse of the cable transfer function receiving the digital signal and generating an equalized digital signal;

a digital cable interpolation and filter unit receiving the equalized digital signal and generating an interpolated filtered signal; and a phase-locked loop receiving the interpolated filtered signal, wherein a digital decimator is arranged in a control loop of the phase-locked loop.

24. The device according to claim 23, wherein the analog/digital converter oversamples the analog data signal n-times in order to transform low-frequency noise into a high-frequency spectrum above the symbol rate.

25. The device according to claim 23, further comprising a digital low-pass filter coupled between said analog/digital converter and said digital cable approximation filter.

26. The device according to claim 25, further comprising a decimator coupled between said digital low pass filter and said digital cable approximation filter.

27. The device according to claim 25, further comprising a high-pass filter coupled between said decimator and said digital cable approximation filter.

28. The device according to claim 25, wherein the digital cable approximation filter is a FIR filter.

29. The device according to claim 28, further comprising an equalizer control unit coupled with the amplifier and the cable approximation filter.

30. The device according to claim 29, further comprising a memory device for storing sets of coefficients for controlling the cable approximation filter coupled between the equalizer control unit and the cable approximation filter.

31. The device according to claim 15, wherein the analog/digital converter comprises a sigma delta analog/digital converter.

32. The device according to claim 23, wherein the analog/digital converter comprises a sigma delta analog/digital converter.

\* \* \* \* \*

UNITED STATES PATENT AND TRADEMARK OFFICE
CERTIFICATE OF CORRECTION

PATENT NO.        : 7,349,508 B2                                              Page 1 of 1
APPLICATION NO.   : 10/714202
DATED             : March 25, 2008
INVENTOR(S)       : Thomas Duda et al.

It is certified that error appears in the above-identified patent and that said Letters Patent is hereby corrected as shown below:

Column 7, Line 44, Claim 18, please replace "decimated, decimated," with --decimated,--

Signed and Sealed this

Fifteenth Day of July, 2008

JON W. DUDAS
*Director of the United States Patent and Trademark Office*